United States Patent Office 3,042,488
Patented July 3, 1962

3,042,488
PREPARATION OF PERMONOSULPHATES
Anthony MacDonald Hildon, Dunstable, and John Geoffrey Marshall, Eversholt, near Bletchley, England, assignors to Laporte Chemicals Limited, Luton, England, a British company
No Drawing. Filed Jan. 12, 1960, Ser. No. 1,850
Claims priority, application Great Britain Mar. 11, 1958
11 Claims. (Cl. 23—114)

This invention relates to the preparation of permonosulphates (the salts of permonosulphuric acid, also called Caro's acid) and is more particularly concerned with the preparation of permonosulphates of sodium potassium, lithium, caesium, ammonium, calcium, strontium, barium, magnesium, and zinc, hereinafter referred to as "the aforesaid metals." Of these the sodium, potassium, and ammonium permonosulphates are the most important.

It has previously been proposed to manufacture the permonosulphates, particularly those of potassium, and sodium, by preparing permonosulphuric acid itself and then neutralising with the appropriate carbonate or hydroxide. This process requires refrigeration as there is considerable heat of neutralisation and dilution involved. The use of the carbonate or hydroxide tends to make the process expensive.

It has now been found according to this invention that the permonosulphates may be produced by direct reaction between the appropriate pyrosulphate and hydrogen peroxide according to this reaction:

$$S_2O_7^{2-} + H_2O_2 \rightarrow HSO_5^- + HSO_4^-$$

In these cases the cation is one of the aforesaid metals.

It will be seen from this equation, that the permonosulphate produced in accordance with this invention is always obtained in admixture with the corresponding acid sulphate.

The term "pyrosulphates" as used herein includes the product obtained by heating acid sulphates or by reacting sulphur trioxide with a sulphate. The products obtained may have the overall empirical formula associated with pyrosulphates but do not necessarily contain the pyrosulphate ion.

The percentage conversion of the pyrosulphate to the permonosulphate is dependent upon the concentration of hydrogen peroxide present in the reaction mixture. The expression "percent w./w." refers to percent by weight (in contrast to percent by volume).

The minimum concentration of hydrogen peroxide that can be used for the reaction depends upon the minimum acceptable concentration of permonosulphate in the final product.

As one mol of pyrosulphate will react with one mol of water or hydrogen peroxide (or any mixture of them) it is possible to deduce the concentration of permonosulphate in the final product from the concentration of hydrogen peroxide present.

For example, using 100% $K_2S_2O_7$ the following conversion would be obtained ideally:

$H_2O_2$ concentration:

| Mol percent— | Percent w./w. |
| --- | --- |
| 100 | 100 |
| 50 | 65 |
| 20 | 32 |

$KHSO_5$ in final product:

| Mol percent— | |
| --- | --- |
| 50 | 53 |
| 25 | 27 |
| 10 | 11 |

Thus the concentration of $KHSO_5$ in the final product expressed as mol percent is half that of the hydrogen peroxide used.

If the minimum acceptable concentration of $KHSO_5$ in the final product were 25% w./w. then the minimum hydrogen peroxide concentration necessary to give this would be approximately 62% w./w. To achieve a concentration of 5% w./w. $KHSO_5$ in the final product a hydrogen peroxide concentration of 15.7% w./w. would be required. 5% $KHSO_5$ may be taken as the lowest worthwhile limit as a product of approximately 0.5% w./w. available oxygen results. In the case of the other pyrosulphates the percentage of permonosulphate in the final product is varied, in order to give a final product containing 0.5% available oxygen, in accordance with the equivalent weight of the metal substituted for potassium. On the basis of the information given above it is a simple matter to calculate the concentration of hydrogen peroxide theoretically required to treat these other pyrosulphates to give a product containing 0.5% available oxygen.

Accordingly, the term "the hydrogen peroxide being present in the aforesaid concentration" as used herein means that the hydrogen peroxide concentration based on the total water and hydrogen peroxide content of the reaction mixture must be at least such as is theoretically required to give a product containing at least 0.5% available oxygen.

Of the two general methods available for the preparation of the pyrosulphate (namely the heating of an acid sulphate or reacting sulphur trioxide with a sulphate), that employing the reaction between the corresponding sulphate and sulphur trioxide is to be preferred since this leads to a pyrosulphate of slightly increased re-activity. This is particularly so where the product produced by reaction between the sulphate and sulphur trioxide contains a slight excess of sulphur trioxide. The general method for reacting the sulphate and sulphur trioxide which we prefer to follow is as follows: Dry air is passed over liquid sulphur trioxide. Liquid sulphur trioxide has a high vapour pressure and, as a result, the dry air becomes saturated with sulphur trioxide vapour. The so-saturated air is then passed over the sulphate, which is in a finely divided state and heated to 170–200° C.

According to the present invention a process is provided for the preparation of the permonosulphates of sodium, potassium, lithium, caesium, ammonium, calcium, strontium, barium, magnesium and zinc comprising reacting a pyrosulphate of sodium, potassium, lithium, caesium, ammonium, calcium, strontium, barium, magnesium or zinc with hydrogen peroxide, the hydrogen being present in the aforesaid concentration (as hereinbefore defined).

Preferably the permonosulphate is the sodium, potassium, or ammonium salt.

Preferably the hydrogen peroxide concentration is at least 80% w./w. based upon the total water + hydrogen peroxide content of the reactants.

The amount of permonosulphate formed being limited by the amount of water in the system, we prefer to oxidise the pyrosulphate in a so-called "dry-mix" method.

In this method the hydrogen peroxide is added over a period—say one minute—to the dry powdered pyrosulphate. A homogeneous paste results upon stirring and this paste is allowed to stand.

Since the pyrosulphate reacts readily with water and the presence of the water limits the amount of the permonosulphate formed the "dry-mix" method is particularly effective in the oxidation of the pyrosulphate but the use of heat does not appear to aid the conversion. Indeed, where the pyrosulphate has been formed by the interaction of sulphur trioxide and the corresponding sulphate, it may be necessary, because of the exothermic nature of the reaction, to cool the paste on formation or to add the hydrogen peroxide slowly in order to prevent decomposition owing to vigorous reaction.

It is undesirable to allow the temperature to rise above 50° C., the general range of temperature employable being between room temperature and 50° C. Higher conversions of hydrogen peroxide to permonosulphate may be obtained the higher the molecular ratio of $K_2S_2O_7:H_2O_2$ but this is not necessarily an attractive proposition because of the desirability of having a relatively high concentration of the permonosulphate in the final product.

The following examples, in which the parts are by weight, illustrate the process of the present invention.

*Example 1.—Oxidation of Potassium Pyrosulphate by Hydrogen Peroxide by the "Dry-Mix" Method*

The potassium pyrosulphate which was 100% w./w. was prepared by dehydrating potassium bisulphate.

100 parts of potassium pyrosulphate and 13.9 parts of 97% w./w. hydrogen peroxide were mixed and made into a paste. Analysis of the mixture after four hours showed that 79.8% of the original hydrogen peroxide had been converted to potassium permonosulphate.

*Example 2.—Oxidation of Potassium Pyrosulphate by Hydrogen Peroxide by the "Dry-Mix" Method*

The potassium pyrosulphate was prepared by reacting potassium sulphate with sulphur trioxide. It contained a small excess (5.9% w./w.) of sulphur trioxide.

100 parts of potassium pyrosulphate and 13.9 parts of 97% w./w. hydrogen peroxide were mixed and made into a paste. Analysis of the mixture 30 minutes after mixing showed 84.8% of the original hydrogen peroxide had been converted to potassium permonosulphate.

*Example 3.—Oxidation of Sodium Pyrosulphate by Hydrogen Peroxide by the "Dry-Mix" Method*

The sodium pyrosulphate was prepared by reacting together sodium sulphate and sulphur trioxide. It contained 3.5% w./w. excess sulphur trioxide.

100 parts of sodium pyrosulphate and 15.8 parts of 96% w./w. hydrogen peroxide were mixed to form a paste. Analysis of the mixture 15 minutes after mixing showed that 55.4% of the original hydrogen peroxide had been converted to sodium permonosulphate.

*Example 4.—Oxidation of Magnesium Pyrosulphate by Hydrogen Peroxide*

The magnesium pyrosulphate contained 8.3% w./w. excess sulphur trioxide.

100 parts of magnesium pyrosulphate and 17.7 parts of 96% w./w. hydrogen peroxide were mixed to form a paste. Analysis of the mixture after 15 minutes showed that 70.3% of the original hydrogen peroxide had been converted to magnesium permonosulphate.

*Example 5.—Oxidation of Ammonium Pyrosulphate by Hydrogen Peroxide*

The ammonium pyrosulphate was prepared by reacting ammonium sulphate with sulphur trioxide at 175° C. The product was liquid at this temperature and cooled to a hard deliquescent solid at room temperature which contained 2.3% excess sulphur trioxide w./w.

100 parts of the ammonium pyrosulphate, which had been ground in a dry atmosphere, were mixed with 16.7 parts of 96% hydrogen peroxide. Analysis of the mixture 15 minutes after mixing showed that 62% of the original hydrogen peroxide had been converted to ammonium permonosulphate.

*Example 6.—Oxidation of Zinc Pyrosulphate by Hydrogen Peroxide*

The zinc pyrosulphate was prepared by reacting together zinc sulphate and sulphur trioxide. The sulphur trioxide was in excess to the extent of 6.5% w./w.

100 parts of zinc pyrosulphate and 14.2 parts of 99% w./w. hydrogen peroxide were mixed to form a paste. Analysis of the mixture after 15 minutes showed that 61.3% of the original hydrogen peroxide had been converted to zinc permonosulphate.

*Example 7.—Oxidation of Barium Pyrosulphate by Hydrogen Peroxide*

The barium pyrosulphate was prepared by reacting barium sulphate with sulphur trioxide. It contained 7 mole percent of unconverted barium sulphate.

100 parts of barium pyrosulphate and 11.3 parts of 96% hydrogen peroxide were mixed and made into a paste. Analysis of the mixture 30 minutes after mixing showed that 41% of the original hydrogen peroxide had been converted to barium permonosulphate.

*Example 8.—Oxidation of Calcium Pyrosulphate by Hydrogen Peroxide*

The calcium pyrosulphate was prepared by reacting calcium sulphate with sulphur trioxide. It contained a small excess (7% w./w.) of sulphur trioxide.

100 parts of calcium pyrosulphate and 16.4 parts of 96% hydrogen peroxide were mixed and made into a paste. Analysis of the mixture 30 minutes after mixing showed that 51% of the original hydrogen peroxide had been converted to calcium permonosulphate.

This application is a continuation-in-part of our application No. 796,271 filed March 2, 1959, now abandoned.

What we claim is:

1. A process for preparing permonosulphates and bisulphates comprising reacting hydrogen peroxide directly with a compound selected from the group consisting of pyrosulphates of sodium, potassium, lithium, caesium, ammonium, calcium, strontium, barium, magnesium and zinc at a temperature range between about room temperature and 50° C.

2. The process of claim 1 wherein said hydrogen peroxide is at least 80% of a water solution, based on weight.

3. The process of claim 2 wherein the quantities of said hydrogen peroxide and said pyrosulphate are equimolecular.

4. The process of claim 2 wherein the said hydrogen peroxide and said pyrosulphate are mixed together to form a paste.

5. The process of claim 2 wherein said pyrosulphate contains free sulphur trioxide.

6. The process of claim 2 wherein said pyrosulphate is formed by dehydrating the corresponding bisulphate.

7. The process of claim 2 wherein said pyrosulphate is formed by reacting the corresponding sulphate with sulphur trioxide.

8. The process of claim 7 wherein said sulphate is in finely divided form and is reacted at a temperature in the range of 150 to 200° C. with gaseous sulphur trioxide.

9. The process of claim 2 wherein said pyrosulphate is sodium.

10. The process of claim 2 wherein said pyrosulphate is potassium.

11. The process of claim 2 wherein said pyrosulphate is ammonium.

References Cited in the file of this patent

Price: "Per-Acids and Their Salts," Monographs on Inorganic and Physical Chemistry, Longmans, Green and Co., N.Y., 1912, page 52.

Mellor: "A Comprehensive Treatise on Inorganic and Theoretical Chemistry," Longmans, Green and Co., N.Y., vol. 10, 1930, pages 440, 445, 446.